Sept. 11, 1928.

L. N. WHEELER

EXHAUST GAS WATER HEATER

Filed Aug. 30, 1921

1,683,747

Inventor
Lawrence N. Wheeler
by Wilkinson & Harris
Attorneys

Patented Sept. 11, 1928.

1,683,747

UNITED STATES PATENT OFFICE.

LAWRENCE N. WHEELER, OF MONROVIA, CALIFORNIA.

EXHAUST-GAS WATER HEATER.

Application filed August 30, 1921. Serial No. 496,823.

My invention relates to the art of heating, being more particularly a device by means of which the heat units contained in the exhaust gases from an internal combustion engine are utilized for heating purposes.

The principal object of my invention is to produce a device of the class described of simple form and construction by means of which the hot exhaust gases from an internal combustion engine may be utilized for heating a body of water.

Other objects and advantages will appear hereinafter from the following specification and drawings.

Referring to the drawings, which are for illustrative purposes only,

Figure 1:
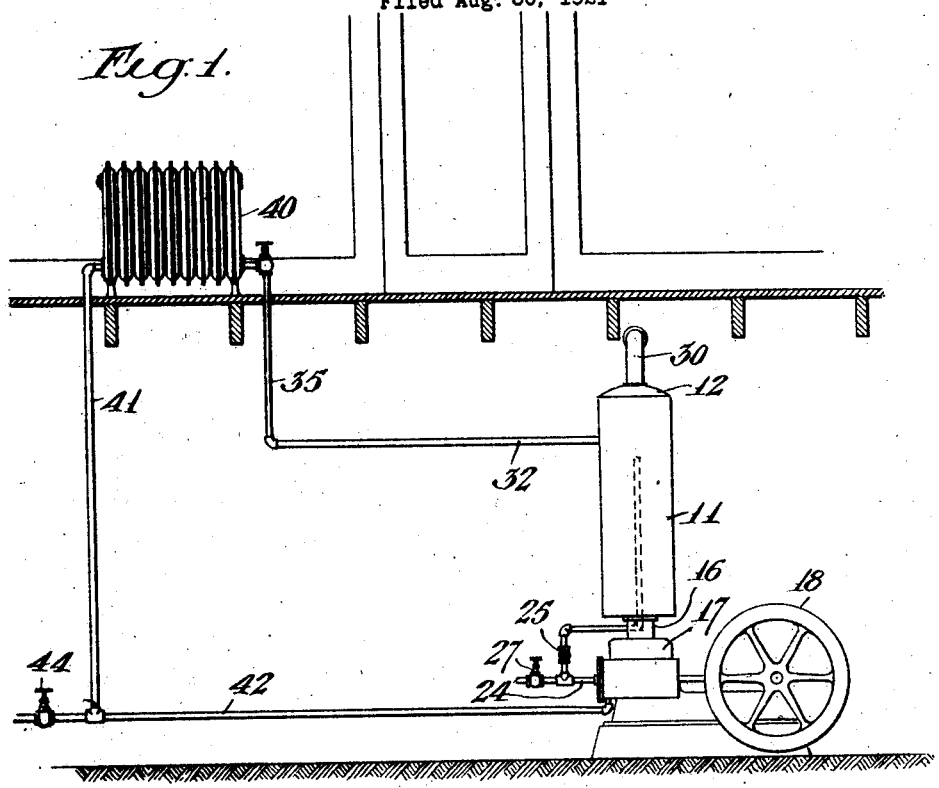
Fig. 1 is a diagrammatic view showing a form of my invention as applied to heating water for use as a heating medium for heating an apartment by a radiator.
Figure 2:
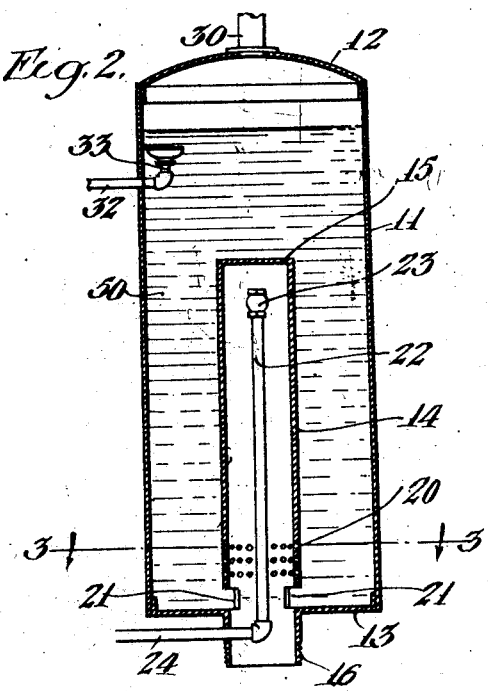
Fig. 2 is a vertical sectional view of the heater.
Figure 3:
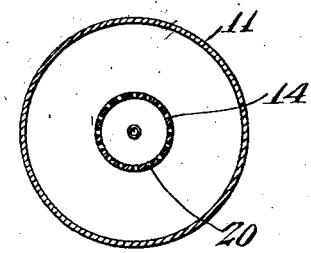
Fig. 3 is a sectional plan view on line 3—3, Fig. 2.

The heater may comprise a cylindrical shell or water tank 11 having a top 12 and bottom 13. An intermediate casing or pipe 14 may extend upwardly through the bottom 13, the upper end of such casing or pipe being shown as closed, as indicated at 15, forming a gas chamber, and the lower end 16 being preferably directly connected to the water jacket 17 of an internal combustion engine 18.

The casing 14 is shown as provided near its lower end with a series of gas outlet perforations 20 and at the bottom with a plurality of water outlet openings 21. As a means for delivering hot gases thereto and therethrough by a circuitous route, I show extending upwardly inside the pipe or casing 14, an inner gas discharge pipe 22, the upper end of which is preferably provided with a check valve 23, such gas pipe 22 being connected to the exhaust pipe 24 of the engine 18, a valve 25 being preferably provided in such piping for the purpose of regulating the amount of exhaust gases permitted to be discharged through the pipe 22. The pipe 24 is also provided with a valve 27 in a branch by means of which the exhaust of gases from the engine into the atmosphere through the pipe 24 may be regulated.

30 designates a relief pipe at the top of the tank 11 by means of which exhaust gases from such tank may be dissipated into the atmosphere.

32 designates a water outlet pipe of a utilization circuit, one end of which extends into the tank, such end being preferably turned upwardly, as indicated at 33, (the other end of the pipe being shown as connected to a pipe 35) the construction here referred to forming a trap to prevent gases in the top of the tank from passing through such pipe 32.

The pipe 35, in the instance shown, is connected in the usual manner to a radiator, indicated at 40, the return pipe of such radiator, indicated at 41, being connected to a pipe 42 which is connected to the water jacket of the engine and forms the inlet water pipe for such jacket, such pipe 42 being also preferably provided with a valve 44 for regulating the introduction of cold water to the water jacket.

The heater, in the form shown, operates in the following manner:

A portion of the exhaust gases from the engine are permitted to pass from the pipe 24 into the pipe 22 and are discharged into the gas chamber in the casing 14, thereby filling such chamber with hot exhaust gases. These gases escape from the casing 14 through the perforations 20 into the body of water 50 in the tank 11, and, passing upwardly in direct contact with such body of water, heat the water. These cooled gases, after collecting in the top of the tank, are discharged through the pipe 30 into the atmosphere in any convenient manner.

The warm water from the cooling jacket of the engine passes into the lower end 16 of the casing 14 and passes through the outlets 21 into the tank where it is heated as just described.

The body of water 50 in the tank may be used for various purposes, in the form shown and described the hot water passes through the pipes 32 and 35 to the radiator 40 where it is used for imparting its heat, through the medium of the radiator, to the room in which the radiator is located, the return water from the radiator, being cooled, descends through the pipe 41 into the pipe 42 where it passes through the water jacket of the engine again into the tank where it is heated and the cycle of movement above described is repeated.

While I have shown and described my invention as used in connection with the water jacket of an engine, it is to be understood that the water supply for the tank 11 may be drawn from any convenient source.

I claim as my invention:

1. In an engine having a water tank; a casing, closed at its upper end, extending upwardly into said tank adapted to be entirely surrounded by the water in said tank and forming a gas chamber; said casing having water outlet openings therein near the bottom of the tank and having also gas outlet perforations above said water outlet openings; a water inlet connection at the lower end of said casing, in free communication with a water jacket on said engine; an exhaust gas inlet pipe extending from said engine to said gas chamber; and a check valve in said pipe; the upper end of said tank having a gas outlet and a water outlet at different levels.

2. In an engine having a water tank; a casing, closed at its upper end, extending upwardly into said tank and forming a gas chamber; said casing having water outlet openings therein at the bottom of the tank and gas outlet perforations above said water outlet openings; a water inlet connection at the lower end of said casing; a hot gas delivery pipe extending therein toward the top of said gas chamber; a check valve on said pipe; the upper end of said tank having a gas outlet and a separate water outlet.

3. A water heater adapted for use in combination with an explosion engine comprising a heating unit surmounting said engine and in open communication with a water jacket surrounding said engine; and means for conducting hot exhaust gases from said engine by a circuitous route into the interior of said unit, then into direct contact with the water therein, and thereafter out through a separate opening.

4. An organization as defined in claim 3 in which said unit contains a casing and a pipe concentric therewith, said pipe being provided with a check valve through which exhaust gases are delivered to said casing.

5. An organization as defined in claim 3 in which said unit contains a casing and a pipe concentric therewith, said pipe being provided with a check valve through which exhaust gases are delivered to said casing and said casing being provided, near its lower end, with separate outlets for gas and water.

In testimony whereof, I have hereunto set my hand at Monrovia, California, this 12th day of July, 1921.

LAWRENCE N. WHEELER.